United States Patent
Sato (10) Patent No.: US 11,082,583 B2
(45) Date of Patent: Aug. 3, 2021

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventor: Yusuke Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 180 days.

(21) Appl. No.: 15/997,816

(22) Filed: Jun. 5, 2018

(65) Prior Publication Data
US 2018/0367699 A1   Dec. 20, 2018

(30) Foreign Application Priority Data

Jun. 19, 2017   (JP) .............................. JP2017-119393

(51) Int. Cl.
| H04N 1/44 | (2006.01) |
| G06K 9/00 | (2006.01) |
| H04N 1/00 | (2006.01) |
| G06F 3/12 | (2006.01) |

(52) U.S. Cl.
CPC ......... *H04N 1/4413* (2013.01); *G06F 3/1222* (2013.01); *G06F 3/1238* (2013.01);
(Continued)

(58) Field of Classification Search
CPC .. H04N 1/4413; H04N 1/444; H04N 1/00856; G06K 9/00456; G06K 2209/01;
(Continued)

(56) References Cited

U.S. PATENT DOCUMENTS

| 9,172,846 | B2 | 10/2015 | Hasegawa | |
| 2014/0043654 | A1* | 2/2014 | Hayashi | H04N 1/32144 358/3.28 |
| 2016/0080366 | A1* | 3/2016 | Agarwal | H04L 63/0838 726/6 |
| 2016/0148039 | A1* | 5/2016 | Potash | G06F 21/36 382/119 |

(Continued)

FOREIGN PATENT DOCUMENTS

| JP | 2011-223348 A | 11/2011 |
| JP | 2011223348 A * | 11/2011 |

(Continued)

OTHER PUBLICATIONS

Mar. 9, 2021 Office Action issued in Japanese Patent Application No. 2017-119393.

(Continued)

*Primary Examiner* — Chad Dickerson
(74) *Attorney, Agent, or Firm* — Oliff PLC (57) ABSTRACT

An information processing apparatus includes a selection unit configured to select an item to be used for a password from among items written on a formatted document, a generation unit configured to generate a password based on a character string obtained as a character recognition result for the item selected by the selection unit on the formatted document, a conversion unit configured to convert document data obtained by reading the formatted document into document data protected with the password, and a setting unit configured to set information for identifying the item used for generation of the password as attribute information of the protected document data.

5 Claims, 4 Drawing Sheets

(52) U.S. Cl.
CPC ..... *G06K 9/00456* (2013.01); *H04N 1/00856* (2013.01); *H04N 1/444* (2013.01); *G06K 2209/01* (2013.01)

(58) Field of Classification Search
CPC ............... H04L 63/083; H04L 63/0838; H04L 63/0846; H04L 9/0861; H04L 9/0863; G06F 21/31; G06F 3/1222; G06F 3/1238
USPC ....... 358/1.11–1.18, 400–404; 382/173–180; 713/182–185
See application file for complete search history.

(56) References Cited

U.S. PATENT DOCUMENTS

2017/0169198 A1* 6/2017 Nichols .................... G06F 21/31
2017/0213022 A1* 7/2017 Potash .................... G06F 21/10

FOREIGN PATENT DOCUMENTS

| | | | |
|---|---|---|---|
| JP | 2015-070493 A | | 4/2015 |
| JP | 6085783 B1 | * | 3/2017 |
| JP | 6085783 B1 | | 3/2017 |

OTHER PUBLICATIONS

Jun. 1, 2021 Office Action issued in Japanese Patent Application No. 2017-119393.

* cited by examiner

| ENTRY NAME | DESCRIPTION AREA | DESCRIPTION FORMAT |
|---|---|---|
| LICENSE NUMBER | (x1, y1), (x2, y2) | 12-DIGIT NUMBER |
| BIRTH DATE | (x3, y3), (x4, y2) | MM/DD/YYYY |
| .... | .... | .... |

FIG. 3

| ITEM ID | LABEL | DESCRIPTION ENTRY TO BE USED | CHARACTER STRING POSITION |
|---|---|---|---|
| 1 | LAST 4 DIGITS OF LICENSE NUMBER | LICENSE NUMBER | 9-12 NOTE: THIS REPRESENTATION MEANS THAT 9TH TO 12TH CHARACTERS ARE USED. |
| 2 | LICENSE NUMBER | LICENSE NUMBER | 1-12 |
| 3 | DAY OF BIRTH DATE | BIRTH DATE | 4-5 |
| 4 | MONTH OF BIRTH DATE | BIRTH DATE | 1-2 |

FIG. 4

| ITEM POSITION | ITEM ID |
|---|---|
| 1 | 1 |
| 2 | 3 |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-119393 filed Jun. 19, 2017.

BACKGROUND

(i) Technical Field

The present invention relates to an information processing apparatus and a non-transitory computer readable medium storing a program.

(ii) Related Art

Scanners and multifunction peripherals may have a special scanning function for formatted documents including personal information, such as ID cards (driver's license cards and credit cards). For example, this function involves generating a document in which scanned images on both sides of a formatted document are arranged on one page and printing the document or outputting the document as a file. The file may be output in the form of a portable recording medium such as a universal serial bus (USB) memory or as a file attached to an electronic mail. The scanners and multifunction peripherals may also have a function of setting a password for the file as a measure against leakage.

SUMMARY

According to an aspect of the invention, there is provided an information processing apparatus including a selection unit configured to select an item to be used for a password from among items written on a formatted document, a generation unit configured to generate a password based on a character string obtained as a character recognition result for the item selected by the selection unit on the formatted document, a conversion unit configured to convert document data obtained by reading the formatted document into document data protected with the password, and a setting unit configured to set information for identifying the item used for generation of the password as attribute information of the protected document data.

BRIEF DESCRIPTION OF THE DRAWINGS

An exemplary embodiment of the present invention will be described in detail based on the following figures, wherein.

DETAILED DESCRIPTION

Figure 1:
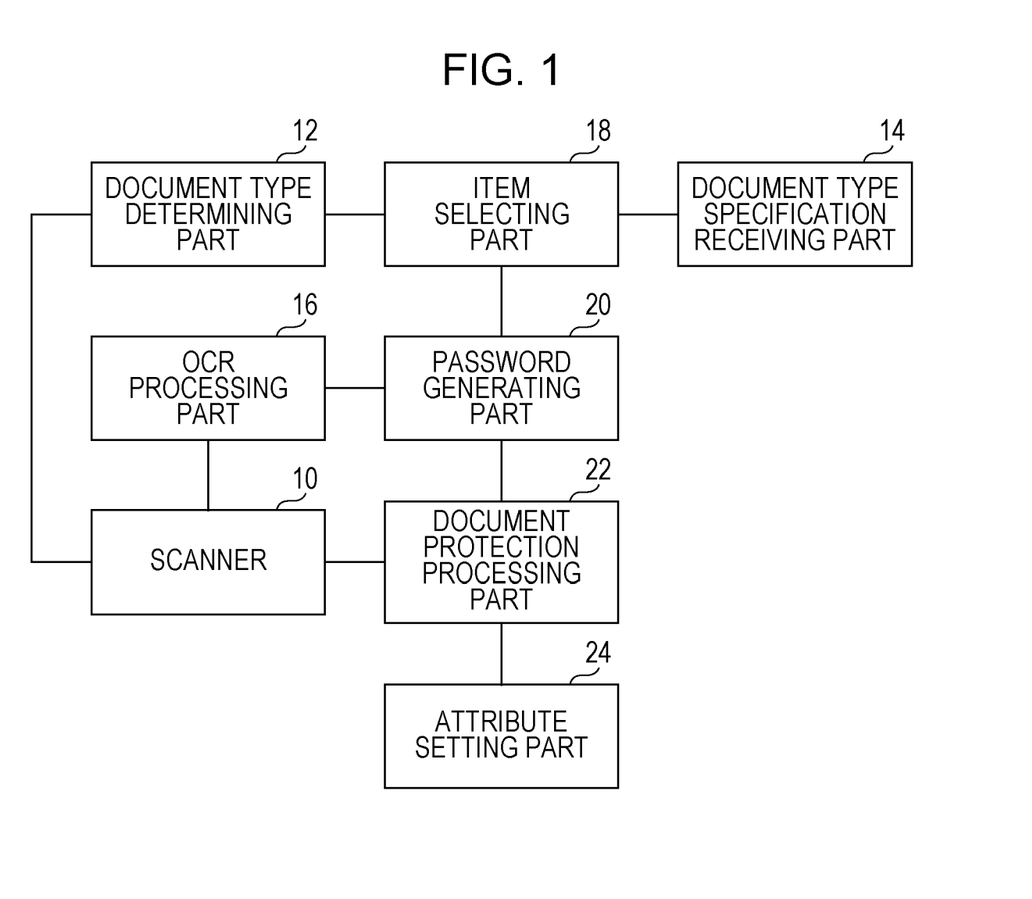
FIG. 1 illustrates an example of the functional configuration of an information processing apparatus of an exemplary embodiment.

FIG. 1 illustrates an information processing apparatus according to an exemplary embodiment of the present invention. In the example described below, the information processing apparatus is an apparatus including a scanner, such as a multifunction peripheral (multifunction apparatus having functions of a scanner, a printer, a facsimile machine, and the like). The information processing apparatus need not essentially include a scanner but may receive and process images scanned by a scanner.

Figure 2:
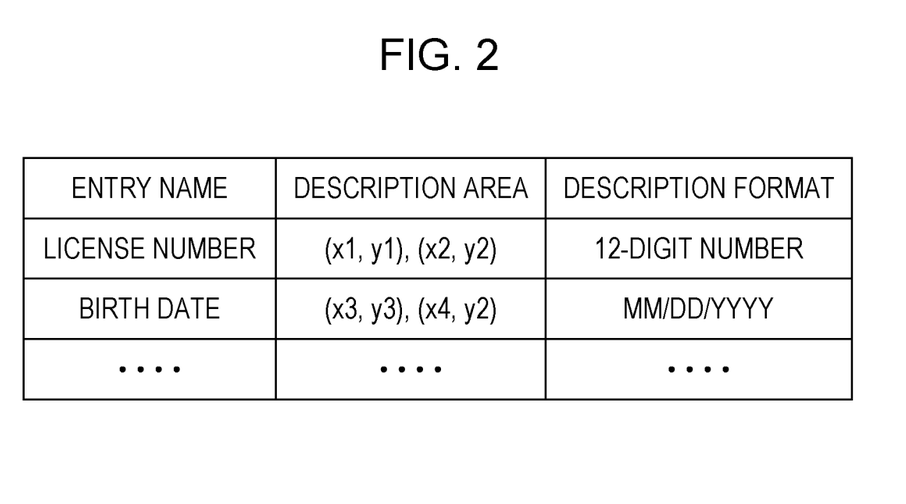
FIG. 2 illustrates an example of data contents in a description entry table.
Figure 3:
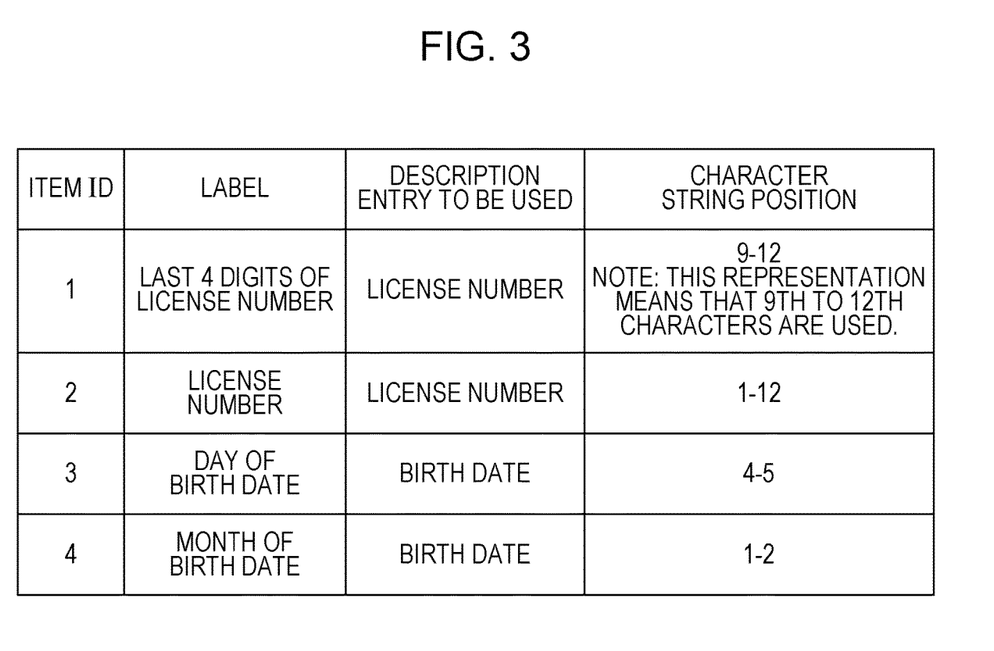
FIG. 3 illustrates an example of data contents in a password candidate table.
Figure 4:
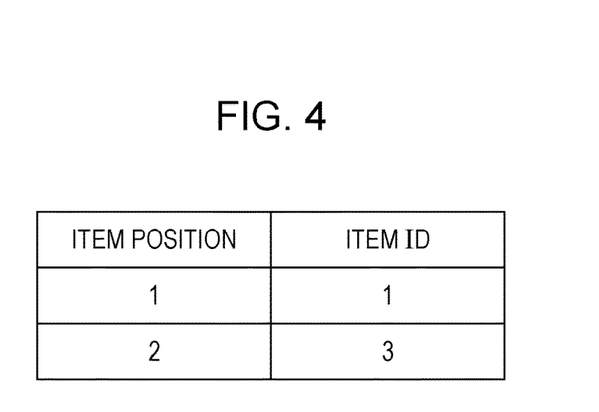
FIG. 4 illustrates an example of data contents in a password management table.

FIG. 2 to FIG. 4 illustrate examples of data that is stored in the information processing apparatus and is used for processing. The data is described first.

FIG. 2 illustrates an example of a description entry table. The description entry table is a table that holds information on each description entry written on a formatted document. The example of FIG. 2 is a description entry table for driver's license cards. In the description entry table, the names of description entries (entry names) such as a license number and a birth date and information that defines description areas and description formats of the description entries are registered in association with each other.

In the illustrated example, the description area is represented by a set of coordinates at an upper left corner and a lower right corner of a rectangular area where the value of the corresponding description entry is written in a plane of the formatted document. When the description entries are written on both sides of the formatted document, the information on the description area of each description entry also defines any one of the front and back sides where the description entry is written. When the formatted document has plural pages, the information on the description area of each description entry also defines a page where the description entry is written.

The information on the description format defines a format of a character string that represents the value of the corresponding description entry. In the example of FIG. 2, the license number is represented by a character string of a twelve-digit number. The birth date is represented by a character string of ten characters in total, that is, in the order from the left, a sequence of a two-digit number that represents a month, a character that represents a slash mark, a sequence of a two-digit number that represents a day, a character that represents a slash mark, and a sequence of a four-digit number that represents a year.

The information processing apparatus stores description entry tables for individual document types that are handled by the information processing apparatus. The driver's license card is an example of the document type and various other examples such as a health insurance card, a credit card, and a resident card are applicable as the document type.

FIG. 3 illustrates an example of a password candidate table. The password candidate table is a table that defines candidates of items (referred to as candidate items) that configurate a password for protecting document data obtained by scanning the formatted document among the pieces of information written on the formatted document. The candidate item is a character string of the description entry in the formatted document or a partial character string of the description entry. The password candidate table is prepared for each document type. The example of FIG. 3 is a password candidate table for a document type "driver's license card". In this example, identification information of each candidate item (item ID) and information on a label, a description entry to be used, and a character string position are registered in the password candidate table for each candidate item. The label is the name of the candidate item and is used as information indicating the candidate item when a list of the candidate items is displayed for a user as options for selection of items to be used for a password. The description entry to be used indicates an entry name of the description entry including the character string of the candidate item. The character string position indicates a positional range of the character string of the candidate item in the character string of the description entry to be used. In the illustrated example, a candidate item having an item ID "1" has a label "last 4 digits of license number", which indicates a sequence of four characters corresponding to ninth to twelfth characters from the left in the license number (sequence of twelve characters) written on the driver's license card. A candidate item having an item ID "4" has a label "month of birth date", which indicates a sequence of two characters corresponding to first and second characters from the left in the description entry "birth date".

FIG. 4 illustrates an example of a password management table. The password management table is a table that manages information on items that configurate a password to be used for protecting document data obtained by reading (scanning) a document. The password management table defines an item position and an item ID for each item that configurates the password. The item position is information indicating a position of the item in the password. In this example, the item position indicates a number of the position where the item is arranged from the head (that is, the left end) of the password. The item ID is an ID of the item defined in the password candidate table of FIG. 3. The password management table exemplified in FIG. 4 indicates that a character string of six characters in total, that is, in the order from the left, the last four digits of the license number (item ID "1") and the day of the birth date (item ID "3"), is used as the password.

The description entry table (FIG. 2) and the password candidate table (FIG. 3) are set in the information processing apparatus as setting information and are used repetitively for scanning (and password protection) of various documents. The password management table (FIG. 4) is dynamically generated when a document is scanned (and protected with a password) and is cleared when the password protection of document data of the document is terminated.

The information processing apparatus holds format information for each document type in addition to the three tables described above. The format information for one document type includes information indicating the size of the document of this document type and information indicating the position and shape such as a characteristic mark or line included in the document. The description entry table may be configured as a part of the format information. The format information is used for determining the document type of the image of the scanned document.

The information processing apparatus of this exemplary embodiment is exemplified with reference to FIG. 1. The information processing apparatus includes a scanner 10, a document type determining part 12, a document type specification receiving part 14, an OCR processing part 16, an item selecting part 18, a password generating part 20, a document protection processing part 22, and an attribute setting part 24.

The scanner 10 optically reads a document placed on a reading table to generate document data.

The document type determining part 12 analyzes the document data generated in such a manner that the scanner 10 reads the document, thereby determining a document type of the document data. The document type may be determined by using a publicly-known method. For example, the document type of the document data is determined by determining a document type whose format information indicates characteristics of the document data. The document type may be determined with reference to a character recognition result obtained by the OCR processing part 16 described later.

The document type specification receiving part 14 receives user's specification of a document type of a document to be scanned (or a document that has already been scanned). For example, the document type specification receiving part 14 displays, on a screen of the information processing apparatus, a list of document types that may be handled by the information processing apparatus (that is, document types whose description entry tables and password candidate tables are registered in the information processing apparatus) and prompts the user to specify, from the list, a type of the document to be scanned or the document that has already been scanned. When the user does not specify any document type for the document type specification receiving part 14 (or when the user specifies automatic determination of the document type), the document type determining part 12 may automatically determine the document type.

The OCR processing part 16 performs publicly-known optical character recognition (OCR) processing for the document data generated by the scanner 10, thereby generating data on a character string included in the document data. In this exemplary embodiment, the OCR processing is performed in order to obtain a character string of each description entry that is a component of a password for protecting a file of the document data.

The item selecting part 18 performs processing of selecting one or more items to be used for the password from among the items associated with the description entries in the formatted document. The item selecting part 18 may display, on the screen, a list of the labels of the items included in the password candidate table (see FIG. 3) corresponding to the document type of the scanned document and receive user's selection of items to be used for the password. As another example, the item selecting part 18 may automatically select items to be used for the password from among the items included in the password candidate table corresponding to the document type of the scanned document. When the password is configured by arranging plural items, the item selecting part 18 selects the items to be located at the respective item positions (see FIG. 4) in the password in a sequential manner (by receiving user's selection or by automatic selection). Information on the selected items is registered in the password management table (see FIG. 4). For example, when the user sequentially selects three items from the list of the items, the IDs of the three items are registered in the password management table in the order of item positions "1", "2", and "3". The number of items that configurate the password may be specified by the user or automatically selected by the item selecting part 18.

The password generating part 20 extracts a character string corresponding to each item registered in the password management table from the character string of each description entry obtained by the character recognition in the document data. The password generating part 20 generates the password by arranging the character strings of the respective items at the corresponding item positions (see FIG. 4).

The document protection processing part 22 performs processing of protecting the document data with the password generated by the password generating part 20. The protection processing may be performed by using any one of various publicly-known password protection methods. Examples of the protection processing include processing of encrypting document data with a password serving as an encryption key. A file group of document data for plural pages obtained by the scanning or a combination of a file of document data and a text file of its OCR result may be archived into a single archive file (for example, a zip file) and the password generated by the password generating part 20 may be set as a password for the archive file. The document data protected by the document protection processing part 22 is referred to as protected data.

The attribute setting part 24 sets information on the arrangement of the items selected by the item selecting part 18 as a password hint attribute that is one attribute of the protected data. This information may be generated based on the password management table (see FIG. 4). For example, the value of the password hint attribute of the data protected with the password generated based on the password management table exemplified in FIG. 4 is "[last 4 digits of license number]+[day of birth date] (six characters in total)". The password hint attribute of the protected data is incorporated into, for example, a file attribute of a file of the protected data.

Figure 5:
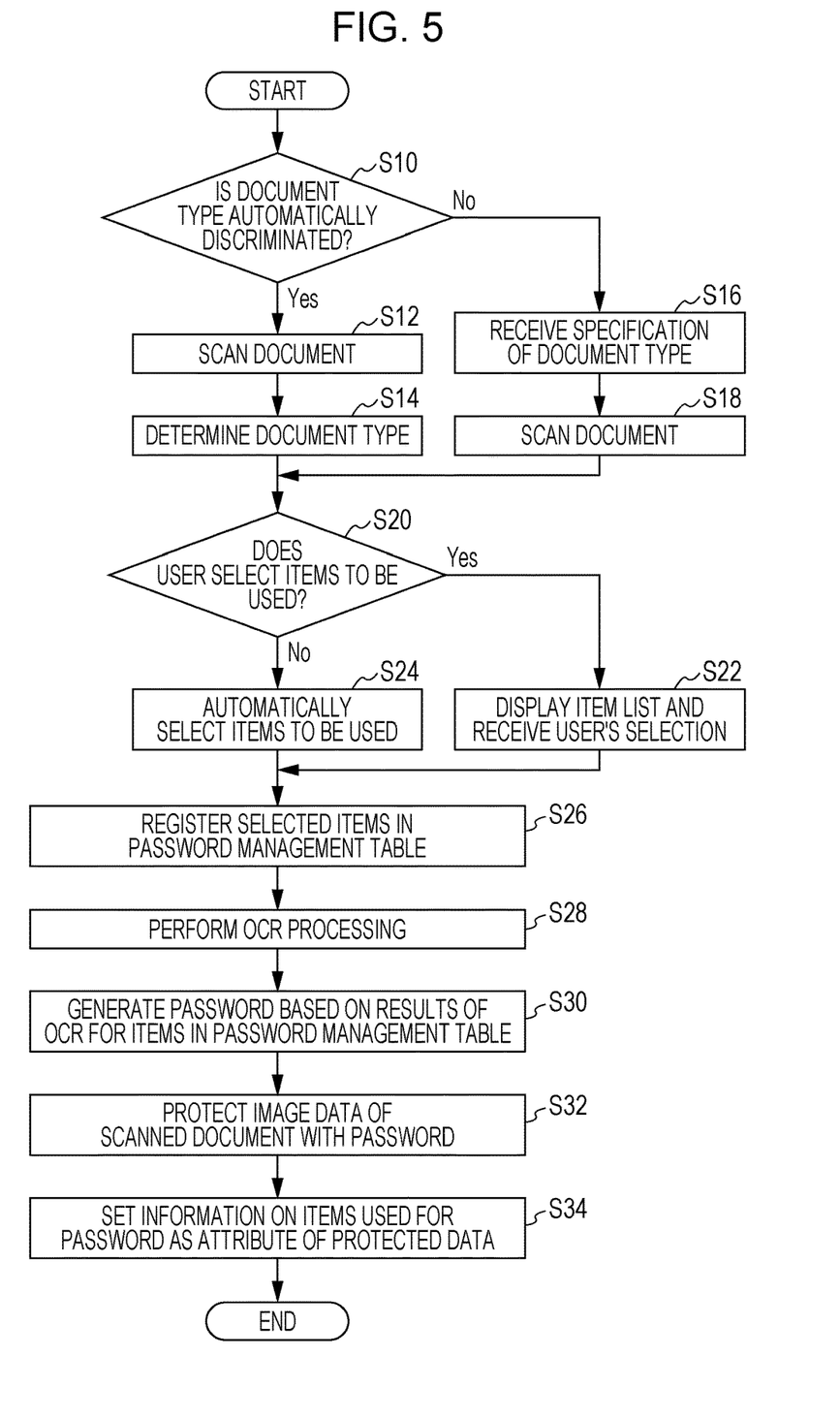
FIG. 5 illustrates an example of a procedure of processing of the exemplary embodiment.

A procedure of the processing to be performed by the information processing apparatus is started when the user selects an operation that involves the scanning and the protection processing (for example, "scanning of personal information document (output as file)") from an operation menu of the information processing apparatus. In this procedure, it is first determined whether to automatically discriminate the document type of a document to be scanned (S10). When the automatic discrimination of the document type is set, the result of determination in S10 is "Yes". In this case, the scanner 10 scans the document set on a document table (S12) to generate document data indicating the document. The document type determining part 12 analyzes the document data obtained by the scanning to determine the document type of the document (S14). When the result of determination in S10 is "No", the information processing apparatus displays the list of the document types on the screen and prompts the user to select the document type of the document to be scanned from the list (S16). The scanner 10 scans the document set on the document table to generate document data indicating the document (S18). When the operation selected by the user specifies the type of the document to be scanned as in a case of "scanning of license card (output as file)", there is no need to perform the processing of automatically determining the document type (S14) or receiving the specification of the document type (S16).

Next, the item selecting part 18 prompts the user to specify user's selection or automatic selection for items to be used for a password (S20). When the user selects "user's selection", the item selecting part 18 displays, on the screen, the list of the labels of the items registered in the password candidate table (see FIG. 3) corresponding to the document type of the scanned document and receives the user's selection of items that configure the password (S22). For example, when the user specifies that the password is configurated by three items, the item selecting part 18 receives the selection of three items in S22.

Figure 6:
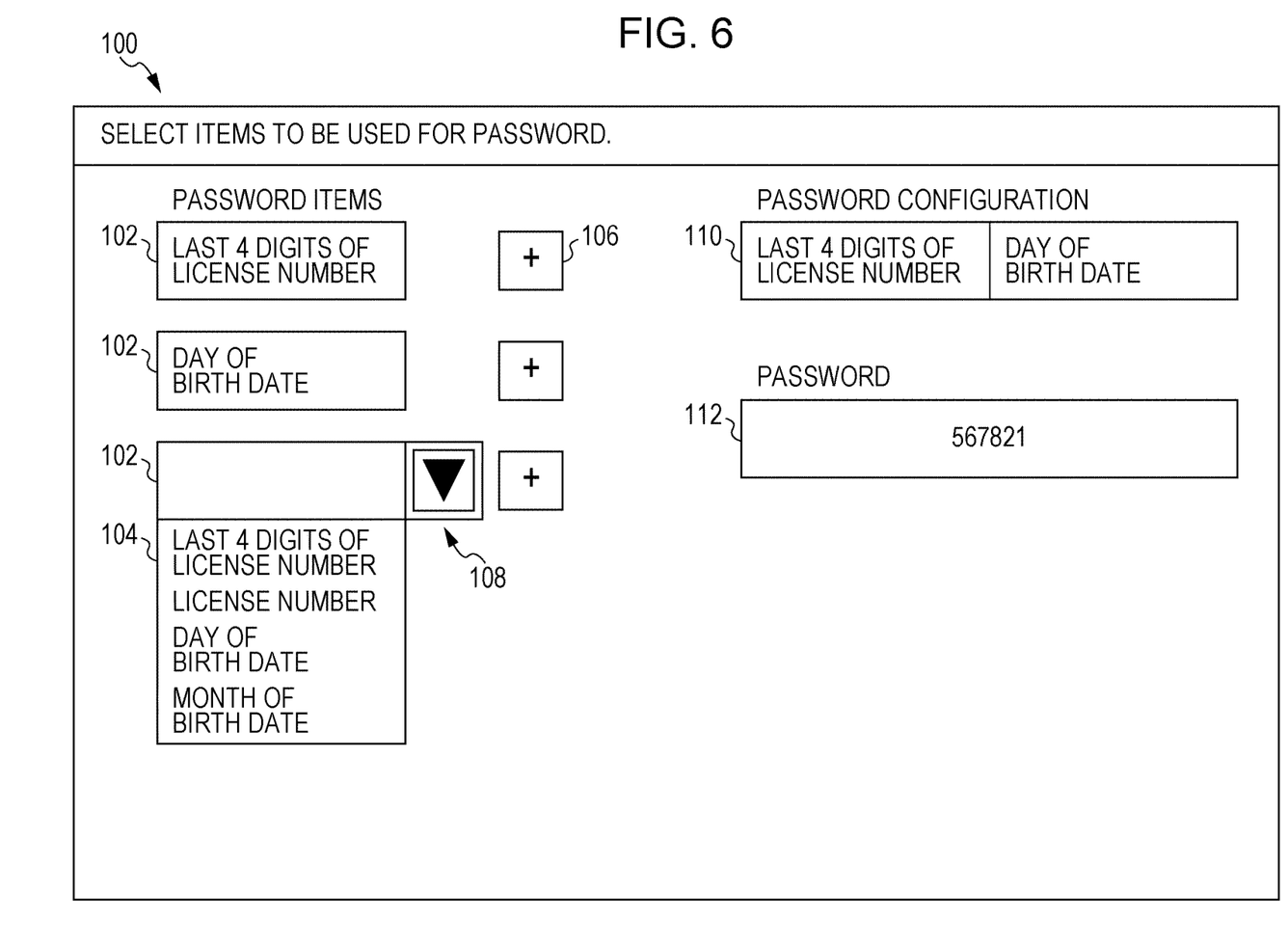
FIG. 6 illustrates an example of a selection screen that receives selection of items that configurate a password.

FIG. 6 illustrates an example of a selection screen 100 for password items to be displayed for the user by the item selecting part 18. The selection screen 100 includes an item selection field 102. The item selection field 102 is provided in the form of a pull-down menu. When the user depresses a menu button 108, the list of the items included in the password candidate table corresponding to the document type of the scanned document is displayed as a pull-down menu 104. The user selects an item to be included in the password from the pull-down menu 104. When an item addition button 106 adjacent to the item selection field 102 is depressed, another item selection field 102 may be added. For example, when the selection screen 100 is opened for the first time, one item selection field 102 is displayed and one item is selectable in this item selection field 102. When the user desires to include another item in the password, the user depresses the item addition button 106 adjacent to the item selection field 102. Then, a second item selection field 102 is displayed in the selection screen 100 and the user may select a second item. In this manner, the user selects as many items as needed. Arrangement of the items that configurate the password is displayed in a password configuration field 110. The password configuration is displayed in such a form that the items selected in the item selection fields 102 in the order from the top are arranged in the order from the head (left) of the password. In the illustrated example, a six-character password configuration having the last four digits of the license number and the day of the birth date that are arranged in the order from the head of the password is specified. The password configuration field 110 is a field where the data contents in the password management table are displayed. A character string of the actual password generated from the description entries in the scanned driver's license card based on the configuration displayed in the password configuration field 110 is displayed in a password field 112.

When the automatic item selection is specified, the item selecting part 18 selects a preset number of items from among the items registered in the password candidate table corresponding to the document type of the scanned document (S24). Information on the items selected in S22 or S24 is registered in the password management table (see FIG. 4) (S26). When the item selecting part 18 automatically selects the items, the item selecting part 18 does not select the same items each time but, for example, randomly selects items each time so that the selected items are difficult to predict.

The OCR processing part 16 executes the OCR processing for the document data obtained by the scanning in S12 or S18 (S28). The OCR processing involves recognizing the character string of each description entry in the document data with reference to the description entry table (see FIG. 2). The OCR processing is executable in parallel with the processing in S20 to S26.

Next, the password generating part 20 generates the password with reference to the password management table generated in S26 (S30). Specifically, the password generating part 20 extracts the character string of each item registered in the password management table from the character string of each description entry of the OCR result. The password generating part 20 generates the password by arranging the extracted character strings in the order of the item positions in the password management table. For example, when the password candidate table and the password management table are the tables exemplified in FIG. 3 and FIG. 4, the generated password is a character string of six characters in total obtained by merging the last four digits of the license number and the day of the birth date (two digits) in the read driver's license card in this order.

Next, the document protection processing part 22 performs the password protection for the scanned document data by using the password generated by the password generating part 20, thereby generating protected data (S32). Then, the attribute setting part 24 sets information indicating the password configuration (arrangement of the items registered in the password management table) as a password hint attribute for the protected data (S34).

The file of the generated protected data having the password hint attribute set therefor is output in a format specified by the user. Examples of the file output format include storage of the file in a portable recording medium such as a USB memory, transfer of the file to a user's portable information terminal by near-field communication, attachment of the file to an electronic mail to an electronic mail address input by the user, and transmission of the file to a server specified by the user.

The example described above is a representative case in which the password is configured by plural items in the document. Alternatively, one item alone may be used as the password.

In the example described above, the information processing apparatus sets the description entry in the scanned document or a part of the description entry as the candidate of the item to be incorporated into the password. Alternatively, information acquired from a portable device carried by the user may be added as the candidate. The user may often carry an electronic money card, a credit card, an employee identification IC card, or any other card-type authenticating device, or a portable information terminal (such as a smartphone) that provides an authenticating function substantially equivalent to that of the card-type authenticating device. When the information processing apparatus has a function of communicating with the portable device or reading information held by the portable device, identification information held by the portable device or a part of the identification information is used as the item to be incorporated into the password. Examples of the identification information held by the portable device include an identification number of the card (such as a credit card number, an identification number of the electronic money card, or an employee number) or information substantially equivalent to those of the card functions installed in the portable information terminal. The item selecting part 18 selects one or more items to be incorporated into the password (automatically or based on user's specification) from a group of the candidate items based on the description entries recognized in the document data obtained by the scanning and the candidate item based on the identification information held by the user's portable device.

The information processing apparatus exemplified above is implemented by causing a computer to execute a program that represents the functions described above. For example, the computer has, as hardware, a circuit configuration in which a microprocessor such as a CPU, memories (first memories) such as a random-access memory (RAM) and a read-only memory (ROM), a controller that controls fixed memories such as a flash memory, a solid-state drive (SSD), and a hard disk drive (HDD), various input/output (I/O) interfaces, and a network interface that controls connection to a network such as a local area network are connected via a bus. The program that describes details of the processing of the functions is stored in the fixed memory such as the flash memory via the network or the like and is installed in the computer. The group of functional modules exemplified above is implemented in such a manner that the program stored in the fixed memory is read in the RAM and is executed by the microprocessor such as the CPU.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a processor programmed to:
obtain scanned document data from scanning a formatted document by the information processing apparatus;
present a screen for selecting items to be used for a password, the screen being separate and distinct from the scanned document data;
receive a selection on the screen selecting an item to be used for a password from among items written on a formatted document, the items not being specified in the formatted document as information to be used for a password;
generate a password by re-arranging a character string obtained as a character recognition result for the item selected on the formatted document, the re-arranged character string, which is the generated password, being not part of the original formatted document;
convert the scanned document data into document data protected with the generated password;
set information for identifying the item used for generation of the password as attribute information of the protected document data, wherein the set attribute information is presented to a user as a password hint; and
incorporate the set information as a file attribute of the protected document data.

2. The information processing apparatus according to claim 1, wherein the processor is programmed to:
receive the selection on the screen selecting a plurality of items to be used for generation of the password from among the items written on the formatted document, and
generate the password based on a plurality of character strings obtained as character recognition results for the plurality of selected items.

3. A non-transitory computer readable medium storing a program causing a computer to execute a process comprising:
obtaining scanned document data from scanning a formatted document by an apparatus including the computer;
presenting a screen for selecting items to be used for a password, the screen being separate and distinct from the scanned document data;
receiving a selection on the screen selecting an item to be used for a password from among items written on a formatted document, the items not being specified in the formatted document as information to be used for a password;

generating a password by re-arranging a character string obtained as a character recognition result for the selected item on the formatted document, the re-arranged character string, which is the generated password, being not part of the original formatted document;

converting the scanned document data into document data protected with the generated password;

setting information for identifying the item used for generation of the password as attribute information of the protected document data, wherein the set attribute information is presented to a user as a password hint; and incorporating the set information as a file attribute of the protected document data.

4. An information processing apparatus, comprising:

an obtaining means configured to obtain scanned document data from scanning a formatted document by a scanning means of the information processing apparatus;

a display means configured to present a screen on a display for selecting items to be used for a password, the screen being separate and distinct from the scanned document data;

a selection receiving means configured to receive a selection on the screen selecting an item to be used for a password from among items written on a formatted document, the items not being specified in the formatted document as information to be used for a password;

a generation means configured to generate a password by re-arranging a character string obtained as a character recognition result for the item selected by the selection receiving means on the formatted document, the re-arranged character string, which is the generated password, being not part of the original formatted document;

a conversion means configured to convert the scanned document data into document data protected with the generated password; and a file attribute setting means configured to set information for identifying the item used for generation of the password as attribute information of the protected document data, wherein the set attribute information is presented to a user as a password hint, and the set information is incorporated into a file attribute of the protected document data.

5. The information processing apparatus according to claim 1, wherein the formatted document is an identification card, and the items written on the formatted document are different pieces of personal information written on the identification card.

\* \* \* \* \*